(12) United States Patent
de Boer

(10) Patent No.: US 9,207,107 B2
(45) Date of Patent: Dec. 8, 2015

(54) ACCESSORY APPARATUS FOR HINDERING ULTRASONIC WAVE PROPAGATION IN FLOWMETERS

(75) Inventor: Geeuwke de Boer, Veenendaal (NL)

(73) Assignee: Krohne AG, Basel (CH)

(*) Notice: Subject to any disclaimer, the term of this patent is extended or adjusted under 35 U.S.C. 154(b) by 461 days.

(21) Appl. No.: 13/478,741

(22) Filed: May 23, 2012

(65) Prior Publication Data

US 2012/0297870 A1 Nov. 29, 2012

(30) Foreign Application Priority Data

May 27, 2011 (DE) .......................... 10 2011 103 859

(51) Int. Cl.
*G01F 3/12* (2006.01)
*G01F 1/66* (2006.01)
*G01F 15/00* (2006.01)
*F15D 1/02* (2006.01)

(52) U.S. Cl.
CPC ................. *G01F 1/662* (2013.01); *F15D 1/025* (2013.01); *G01F 15/00* (2013.01)

(58) Field of Classification Search
CPC ........... F01N 1/089; F01N 1/083; G01F 1/42; G01F 1/662; G01F 15/00; F16L 55/02736; F15D 1/025
USPC .............. 181/256; 138/44, 39, 37; 73/861.91, 73/861.27, 861.02, 861.04, 861.28
See application file for complete search history.

(56) References Cited

U.S. PATENT DOCUMENTS

| | | | |
|---|---|---|---|
| 3,564,912 A | 2/1971 | Malone et al. | |
| 4,715,234 A * | 12/1987 | Allen et al. | ................. 73/861.91 |
| 5,131,279 A * | 7/1992 | Lang et al. | ................. 73/861.27 |
| 5,323,657 A * | 6/1994 | Vander Heyden | ......... 73/861.02 |
| 5,546,812 A | 8/1996 | Drenthen | |
| 6,047,602 A | 4/2000 | Lynnworth | |
| 6,422,092 B1 * | 7/2002 | Morrison et al. | .......... 73/861.04 |
| 6,550,345 B1 | 4/2003 | Letton | |
| 6,647,806 B1 * | 11/2003 | Estrada et al. | ............. 73/861.28 |
| 6,732,595 B2 | 5/2004 | Lynnworth | |

(Continued)

FOREIGN PATENT DOCUMENTS

| | | |
|---|---|---|
| DE | 195 03 714 A1 | 8/1996 |
| DE | 10 2007 004 936 A1 | 6/2008 |

(Continued)

OTHER PUBLICATIONS

Halit Eren, Flowmeters, Dec. 27, 1999, Curtin University of Technology, 615-616.*

*Primary Examiner* — John Fitzgerald
*Assistant Examiner* — Truong Phan
(74) *Attorney, Agent, or Firm* — Roberts Mlotkowski Safran & Cole, PC

(57) ABSTRACT

An accessory apparatus for flowmeters, especially for ultrasonic flowmeters having at least two successively arranged, plate-shaped or disk-shaped flow influencing elements (1, 2) which are provided with recesses and which are located downstream and/or upstream of the flowmeter, the recesses in the flow influencing elements (1, 2) being made and/or the flow influencing elements (1, 2) being arranged in a manner eliminating an unobstructed line of sight in the flow direction. The recesses in the flow influencing elements (1, 2) of the accessory apparatus are slots (3, 4) which are offset so that a line of sight through the accessory apparatus is eliminated.

9 Claims, 3 Drawing Sheets

(56) References Cited

U.S. PATENT DOCUMENTS

| | | |
|---|---|---|
| 7,051,765 B1 * | 5/2006 | Kelley et al. ............... 138/44 |
| 7,073,534 B2 * | 7/2006 | Sawchuk et al. ........... 138/39 |
| 7,810,399 B2 | 10/2010 | van Klooster et al. |
| 2004/0055816 A1 * | 3/2004 | Gallagher et al. ......... 181/256 |
| 2011/0174407 A1 * | 7/2011 | Lundberg et al. .......... 138/37 |

FOREIGN PATENT DOCUMENTS

| | | |
|---|---|---|
| WO | 98/19296 A1 | 5/1998 |
| WO | 00/03206 A1 | 1/2000 |

* cited by examiner

ACCESSORY APPARATUS FOR HINDERING ULTRASONIC WAVE PROPAGATION IN FLOWMETERS

BACKGROUND OF THE INVENTION

1. Field of the Invention

The invention relates to an accessory apparatus for flowmeters, especially for ultrasonic flowmeters, having at least two successively arranged, plate-shaped or disk-shaped flow influencing elements which are provided with recesses and which are located downstream and/or upstream of the flowmeter, the recesses in the flow influencing elements being made and/or the flow influencing elements being arranged such that there is no free line of sight in the flow direction.

2. Description of Related Art

Flowmeters as well as other measuring instruments should "function well" over a measurement range as wide as possible and over a temperature range as wide as possible (the environment in which the flowmeter is used). "To function well" includes mainly, but not solely, a good zero point stability and a low measurement error.

Accessory apparatus for flowmeters, for example, magnetic-inductive flowmeters, but especially for ultrasonic flowmeters are extensively known. In this respect, reference is made only by way of example to the German Patent Application documents DE 195 03 714 and DE 10 2007 004 936 (corresponding to U.S. Pat. No. 7,810,399), U.S. Pat. Nos. 3,564,912; 5,546,812; 6,550,345; and 6,732,595 and to PCT Patent Application Publications WO 98/19296 (corresponding to U.S. Pat. No. 6,047,602) and WO 00/03206, but especially to German Patent Application DE 10 2007 004 936 and corresponding U.S. Pat. No. 7,810,399.

SUMMARY OF THE INVENTION

Flowmeters are calibrated conventionally or computation methods are used which are based on standard conditions with reference to velocity gradients, therefore with reference to the velocity distribution within the flow channel. The standard velocity distribution most frequently used for gases at high Reynolds numbers is the so-called "fully developed turbulent flow". This is a stable equilibrium state which can be reproduced in a long straight pipe with smooth inner walls. Depending on the type of flowmeter, for this purpose a length of the flow path is necessary which corresponds to ten times to even forty times the diameter of the flow channel.

For "good functioning" of flowmeters not only is the "quality of the flow" important, rather what is important is whether unwanted acoustic waves or pressure waves which do not belong to actual operation of the flowmeters and which occur in the flowing medium adversely affect the operation of the flowmeter, and which can influence especially the measurement accuracy, therefore adversely affect the criterion "small measurement error" which belongs to "good functioning".

Often, for whatever reason, valves, flaps and/or throttles are also installed in the lines into which flowmeters of the type under consideration are installed, components which will be called "disruptive elements" below, because they adversely affect the "quality of the flow" on one hand, because on the other they generate acoustic waves which in any case for ultrasonic flowmeters disrupt the acoustic waves used for the measurement with the consequence of measurement errors resulting from them.

As stated initially, the flow influencing elements are located downstream and/or upstream. The logic of arranging the flow influencing elements upstream, therefore in front of the flowmeters viewed in the flow direction, is apparent. However, the arrangement of the flow influencing elements downstream, therefore behind the flowmeters viewed in the flow direction, also makes sense because specifically the "disruptive influences" propagate with a velocity which is very high compared to the velocity of the flowing medium.

Accessory apparatus for flowmeters of the type assumed in the invention are extensively known for example, from Law's Spearman, K-Lap, CPA, BTB, Zanker, Gallagher. In the known accessory apparatus of the type under consideration the recesses in the flow influencing elements are made round.

The known accessory apparatus for flowmeters underlying the invention with respect to their purpose of contributing to "good functioning" of flowmeters are not yet optimum. Consequently the object of the invention is to configure, develop and improve the accessory apparatus under consideration such that thus on the one hand an improvement of the "quality of the flow" is achieved, but especially on the other hand, the adverse affect of "disruptive influences", especially resulting from valves, flaps and/or throttles in the line into which a flowmeter is installed, is reduced, largely reduced or if possible eliminated.

SUMMARY OF THE INVENTION

As stated, the invention relates to an accessory apparatus for flowmeters of different types, for example, for magnetic-inductive flowmeters, but especially for ultrasonic flowmeters. They are always flowmeters with which, installed in a line which routes a flowing medium, the flow rate of the flowing medium through this line is to be measured. The flowing medium can be a liquid medium, a gaseous medium, a liquid medium containing solid and/or gaseous components or a gaseous medium which contains solid and/or liquid components.

If the invention relates, as repeatedly stated, to an accessory apparatus for flowmeters of a different type, nevertheless in the following a particular flowmeter, specifically an ultrasonic flowmeter, will always be assumed below without being associated with a limitation.

For "good functioning" of flowmeters the "quality of the flow" of the flowing medium in the flowmeter is of special importance. In the connection in accordance with the invention for the "quality of the flow", it is important whether it is a laminar or a turbulent flow and how the velocity gradient of the flow appears over the diameter or cross section of the flowmeter.

It was stated at the beginning that in accordance with the invention it is a matter of accessory apparatus for flowmeters. These accessory apparatus can be made differently. One possible implementation is that the accessory apparatus are installed as inherently manageable devices in the line into which the flowmeters are installed. Another possible implementation is to make the accessory apparatus not only as inherently manageable devices, rather to install only the flow influencing elements which represent the accessory apparatus into the lines into which the flowmeters are also installed. It is also theoretically conceivable to provide the flow influencing elements which constitute the accessory apparatus in accordance with the invention in the flowmeters themselves. However, this leads to good results only for a relatively good "quality of flow" when the disruptive influences, for example, due to valves, flaps or throttles, are relatively low.

An important component of the accessory apparatus for flowmeters which are addressed here is plate-shaped or disk-shaped flow influencing elements which are provided with recesses, the recesses in the flow influencing elements being made and/or the flow influencing elements being arranged such that there is "no free line of sight" in the flow direction. "No free line of sight" means the following: since ultrasonic waves propagate similarly to light rays, if the recesses in the flow influencing elements are made and/or the flow influencing elements are arranged such that there is "no free line of sight" in the flow direction, so that the ultrasonic waves cannot propagate unhindered, i.e., cannot travel to the flowmeters unhindered from valves, flaps, and/or throttles which constitute "disruptive elements". The flow influencing elements which are arranged and/or made as described therefore make the flowmeters as it were "blind" to "disruptive influences" proceeding from the "disruptive elements".

The accessory apparatus in accordance with the invention for flowmeters is first characterized essentially in that the recesses in the flow influencing elements are made as slots. Preferably, the slots in the flow influencing elements have a side ratio (ratio of the length to width) greater than 1.

The orientation of the recesses which are made as slots in the flow influencing elements is also important for the accessory apparatus in accordance with the invention. Preferably, the longitudinal direction of the slots runs at least roughly radially, especially exactly radially. In this way, the components of the radial velocity (turbulence) in the flow field directly downstream of the flow influencing elements are reduced, and thus, energy for forming acoustic waves is prevented from being made available in the direction normal to the axis of the line which if present can cause acoustic waves with considerable amplitude.

If the slots run radially in the flow influencing elements, an embodiment is recommended in which the width of the slots increases in the radial direction, preferably increases according to the radius of the flow influencing elements.

The "quality of the flow" can be greatly influenced with the geometry of the slots implemented in the flow influencing elements. Consequently, it can also be shown that with reference to the width of the slots in the flow influencing elements in the radial direction a configuration can be chosen other than the one in which the width of the slots increases in the radial direction. Thus, a configuration can be chosen in which the width of the slots in the flow influencing elements first increases in the radial direction, preferably increases in proportion to the radius, but then decreases again in the radial direction, preferably decreases in proportion to the radius.

The lines in which the flowmeters are installed generally have a circular cross section. This is assumed below even if a circular cross section is not essential.

The number of recesses made as slots in the flow influencing elements is advantageously also made dependent on the diameter of the line in which a flowmeter is installed, and thus dependent on the diameter of the flow influencing elements.

Generally, care will be taken that the flow influencing elements, which essentially constitute the accessory apparatus in accordance with the invention, are rotationally symmetrical and that the recesses made as slots in the flow influencing elements are made rotationally symmetrical. Therefore, preferably the slots in the flow influencing elements will be implemented on a concentric circular ring—concentric to the center point of the flow influencing elements.

If the line in which the flowmeter is installed has a relatively small diameter, it can be sufficient to implement the slots in the flow influencing elements on a concentric circular ring. At a larger diameter of the line, an embodiment is recommended in which the slots in the flow influencing elements are implemented on several circular rings which are concentric to one another; there can be two or three concentric rings, at an especially large diameter of the line there can also be more concentric circular rings on which the slots in the flow influencing elements are implemented. In any case one embodiment is recommended in which the number of slots which are implemented in the flow influencing elements on circular rings which are concentric to one another increases from inside to outside. For example, six slots can be implemented inside, twelve slots on the middle circular ring and twenty four slots on the outer circular ring.

Finally it is recommended that sound-absorbing and/or noise-damping material be provided in the accessory apparatus in accordance with the invention for flowmeters between flow influencing elements.

In particular, there are various possibilities for embodying and developing the accessory apparatus in accordance with the invention for flowmeters, for which reference is made to an exemplary embodiment which is described below and which is shown in the drawings.

DETAILED DESCRIPTION OF THE INVENTION

Figure 1:
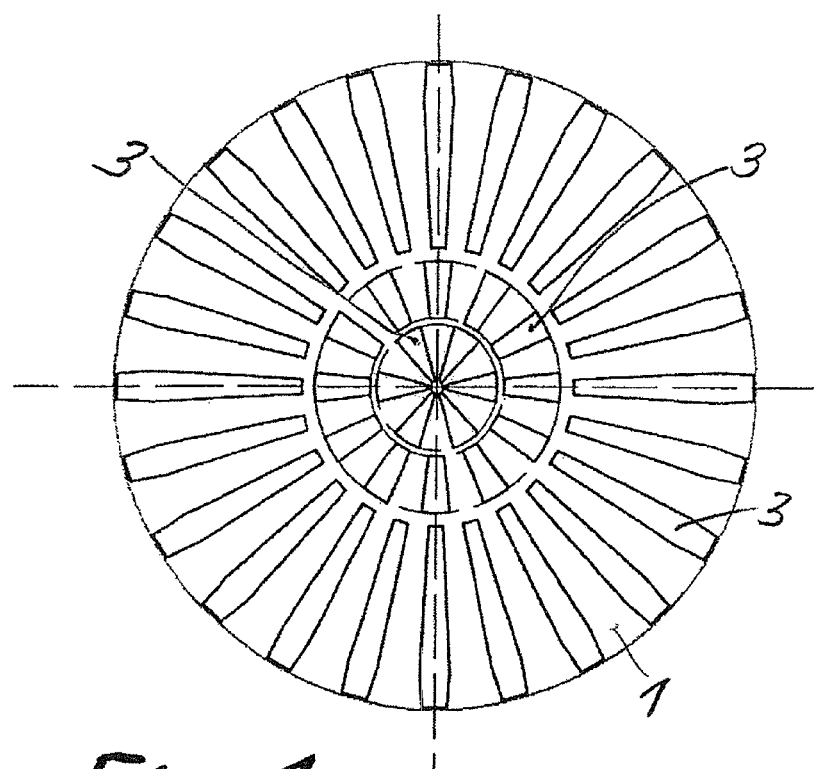
FIG. 1 shows a preferred embodiment of a first flow influencing element which belongs to the accessory apparatus in accordance with the invention.

In accordance with the invention, an accessory apparatus 5 for flowmeters, especially an accessory apparatus for ultrasonic flowmeters comprises at least two successively arranged plate-shaped or disk-shaped flow influencing elements 1, 2 which are provided with recesses and which are located downstream and/or upstream of the flowmeter 6; an embodiment is shown and described in which there are exactly two flow influencing elements 1, 2. It is critical that the recesses in the flow influencing elements 1, 2 are made and/or the flow influencing elements are arranged such that there is no "free line of sight" (as defined above) in the flow direction.

As stated in particular at the beginning, flowmeters should "function well". For "good functioning" of flowmeters, as likewise stated at the beginning, the "quality of the flow" of the flowing medium in the flowmeter is also of great importance. Furthermore it is also stated at the beginning that for "good functioning" of flowmeters not only is the "quality of the flow" important, that what is important is rather whether unwanted acoustic waves or pressure waves which occur in the flowing medium and which do not belong to the actual operation of the flowmeter adversely affect the operation of the flowmeter.

Furthermore, it was explained initially that the accessory apparatus in accordance with the invention can be made differently, that specifically a first possible implementation is characterized in that the accessory apparatus are installed as inherently manageable devices in the line into which the flowmeters are also installed, that another possible implementation is characterized in that the flow influencing elements which constitute the accessory apparatus are installed directly in the lines into which the flowmeters are also installed and that it is also theoretically conceivable to provide the flow influencing elements which constitute the accessory apparatus in accordance with the invention in the flowmeters themselves. The second embodiment is shown and described, therefore the embodiment which is characterized in that the flow influencing elements 1, 2 which constitute the accessory apparatus are installed in the lines (not shown) and in which the flowmeters (not shown) are also installed.

Finally, it was stated at the beginning of what importance it is that the recesses in the flow influencing elements are made and/or the flow influencing elements are arranged such that there is "no free line of sight" in the flow direction, that therefore the flow influencing elements executed and/or arranged as described make the flowmeters so to speak "blind" to the "disruptions" proceeding from "disrupting elements".

In the exemplary embodiment which is shown in the figures, the flow influencing elements 1, 2 form an accessory apparatus in accordance with the invention. Here, it applies that the flow influencing elements 1, 2 form a second embodiment of an accessory apparatus in accordance with the invention. It applies to the two embodiments that the flow influencing elements 1, 2 are arranged in succession, and that the flow influencing elements 1, 2 can be provided downstream, upstream or downstream and upstream of the flowmeter.

For the accessory apparatus in accordance with the invention for flowmeters, first of all, it is important that the recesses in the flow influencing elements 1, 2 are made as slots 3, 4. Here, the slots 3, 4 have a side ratio (ratio of length to width) that is greater than 1, in the illustrated exemplary embodiment much greater than 1. It also applies to the illustrated exemplary embodiment that the longitudinal direction of the slots 3, 4 runs radially and that the width of the slots 3, 4 increases in the radial direction over most of their length in proportion to the radius of the flow influencing elements 1, 2. It applies in part that the width of the slots 3, 4 first increases proportionally to the radius of the flow influencing elements 1, 2, but then decreases again, in proportion to the radius.

Otherwise, it applies to the exemplary embodiment that the slots 3, 4 in the flow influencing elements 1, 2 are implemented on concentric circular rings, specifically on three circular rings. Here, furthermore, it applies that the number of slots 3, 4 which are implemented in the flow influencing elements 1, 2 on the circular rings which are concentric to one another increases from the inside to the outside; inside, six slots 3, 4, on the middle circular ring, twelve slots 3, 4, and on the outer circular ring, twenty four slots 3, 4 are implemented.

Figure 2:
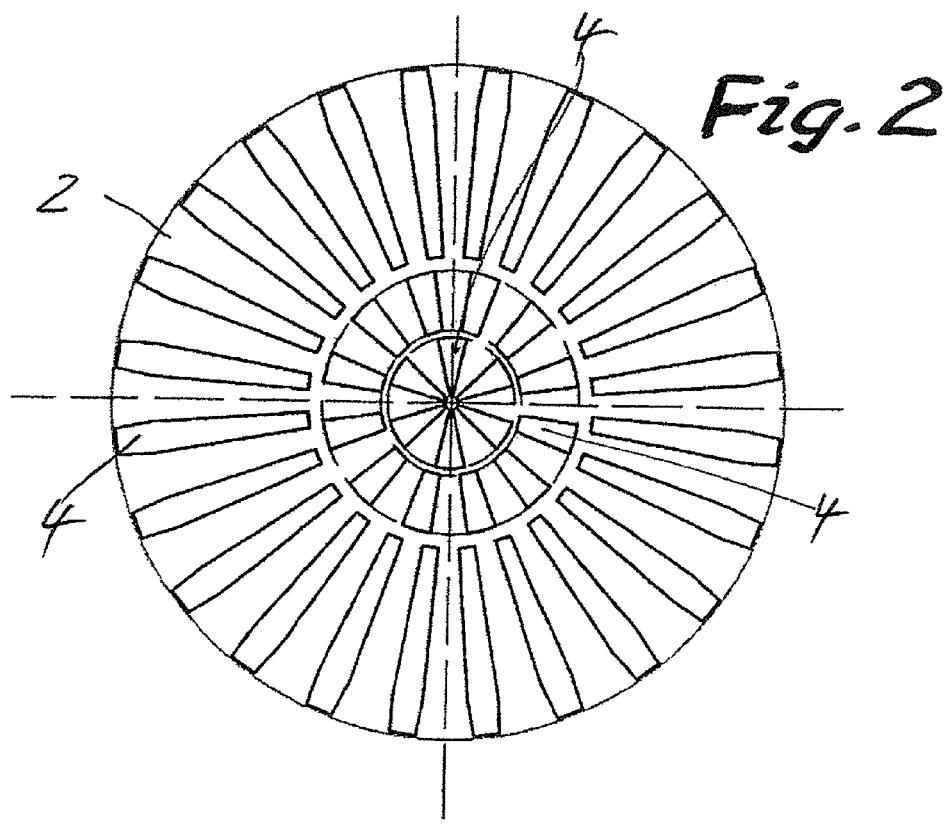
FIG. 2 shows a preferred embodiment of a second flow influencing element which, in addition to the flow influencing element as shown in FIG. 1, belongs to an accessory apparatus in accordance with the invention.
Figure 3:
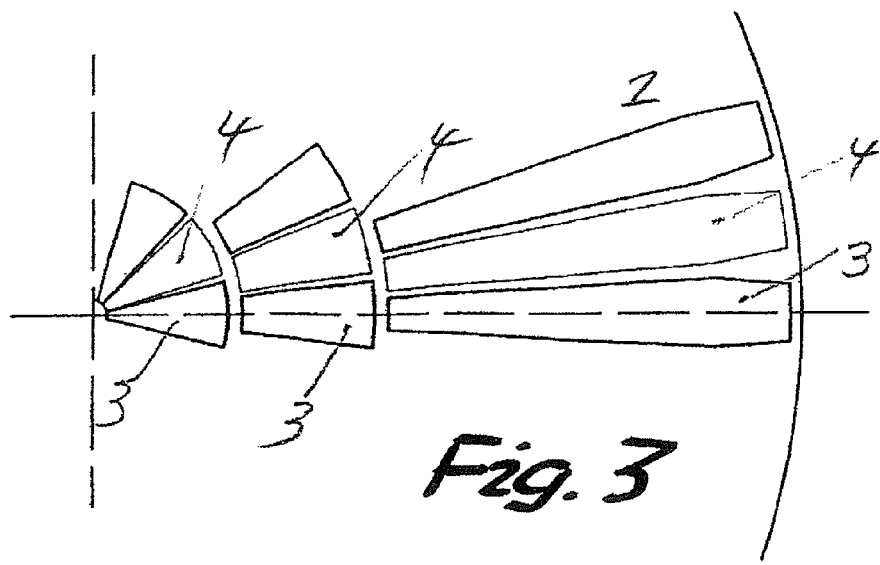
FIG. 3 shows an extract from the flow influencing element as shown in FIG. 1.
Figure 4:
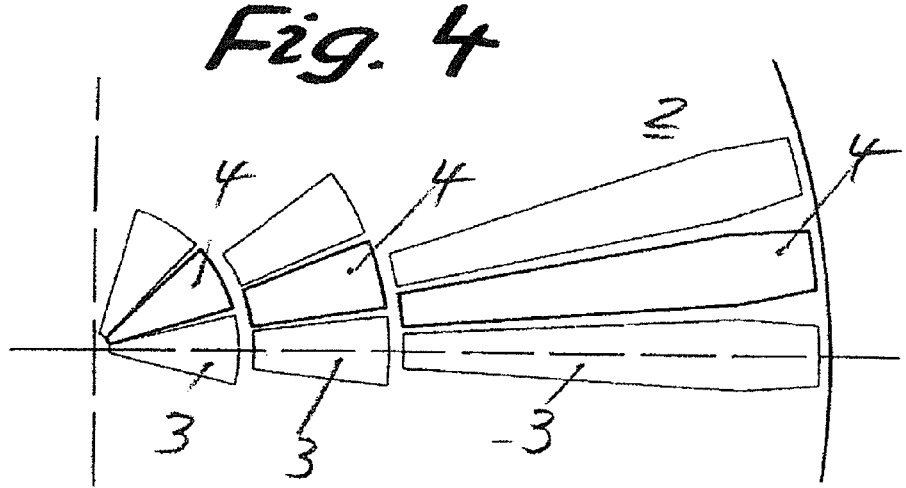
FIG. 4 shows an extract from the flow influencing element as shown in FIG. 2.
Figure 5:
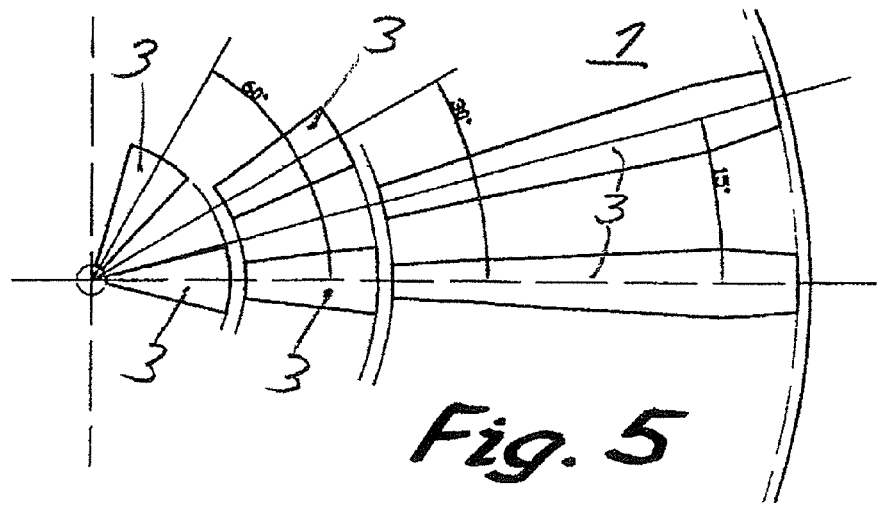
FIG. 5 shows a representation which corresponds to FIG. 3 and in which the "angular distances" of the individual slots are entered.

If the flow influencing element 2 in FIG. 2 is compared to the flow influencing element 1 in FIG. 1 or the extract in FIG. 4 to the extract in FIG. 3, it becomes immediately clear that and offset arrangement of the slots 3, 4 leads to there being "no free line of sight" in the flow direction. In FIG. 3, the slots 3 implemented in the flow influencing element 1 are clearly recognizable. Conversely, the slots 4 implemented in the flow influencing element 2 which is shown by way of an extract in FIG. 4 is only suggested in FIG. 3 so as to show the offset arrangement thereof between consecutive slots 3. Conversely, in FIG. 4 the slots 4 implemented in the flow influencing element 2 are clearly recognizable, while the slots 3 implemented in the flow influencing element 1 which is shown by way of an extract in FIG. 3 is only suggested in FIG. 4.

In addition, it is pointed out that, in the exemplary embodiment, there are only two flow influencing elements 1, 2, but the accessory apparatus in accordance with the invention is however not limited thereto, and there can easily be three, four, five or more flow influencing elements.

Figure 6:
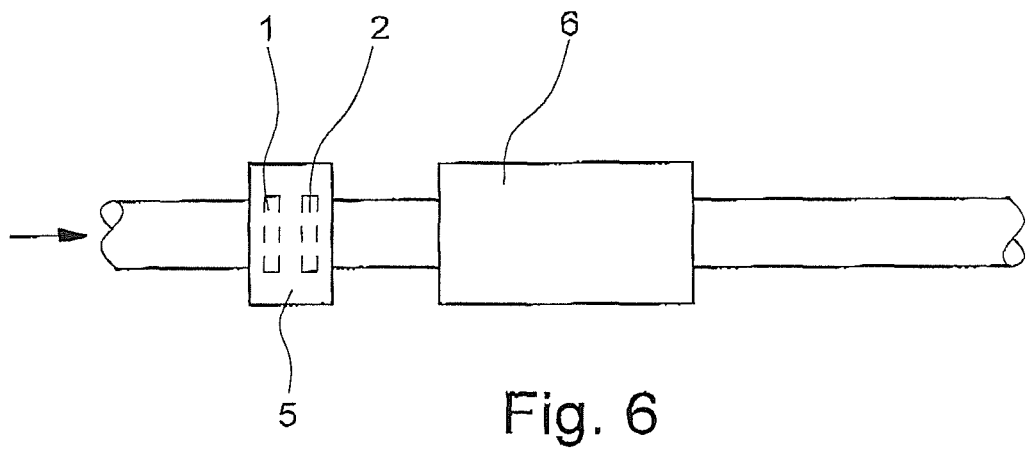
FIG. 6 shows a first arrangement of an embodiment of the accessory apparatus for flowmeters positioned upstream of the flowmeter.
Figure 7:
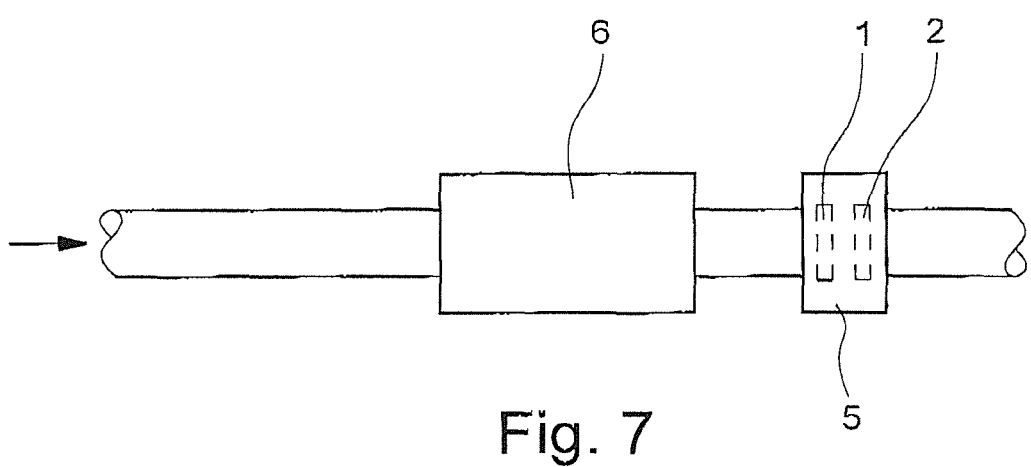
FIG. 7 shows a second arrangement of an embodiment of the accessory apparatus for flowmeters positioned downstream of the flowmeter.
Figure 8:
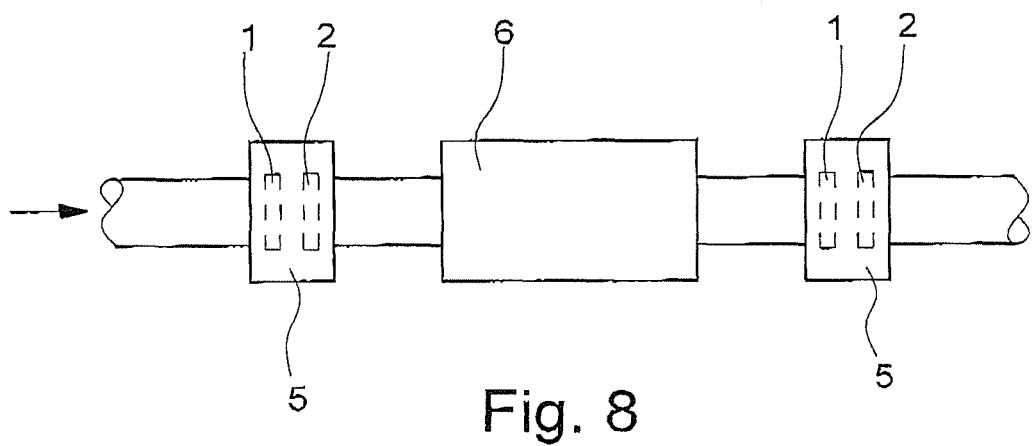
FIG. 8 shows a third arrangement of an embodiment of the accessory apparatus for flowmeters comprising two apparatus, one positioned upstream of the flowmeter and one positioned downstream of the flowmeter.

FIG. 6 shows a first arrangement of an embodiment of the accessory apparatus 5 for flowmeters 6. The accessory apparatus 5 is positioned upstream of the flowmeter 6 and comprises tow disk-shaped flow influencing elements 1, 2. FIG. 7 shows a second arrangement of the accessory apparatus 5 in which the accessory apparatus 5 is positioned downstream of the flow meter 6. FIG. 8 shows a third arrangement of an embodiment of the accessory apparatus 5. In this arrangement, there are two accessory apparatus 5, one accessory apparatus 5 being positioned upstream of the flowmeter 6 and one accessory apparatus 5 being positioned downstream of the flowmeter 6.

Finally, it is pointed out that, in the accessory apparatus in accordance with the invention for flowmeters, there can be sound-absorbing and/or noise damping material between the flow influencing elements; but this is not shown.

What is claimed is:

1. Accessory apparatus for flowmeters, comprising:
at least two successively arranged, plate-shaped or disk-shaped flow influencing elements which are provided with recesses and adapted for being located at at least one of downstream and upstream of the flowmeter, the recesses in the flow influencing elements of one of the flow influencing elements being made and arranged relative to recesses of another of the the flow influencing elements such that they combine to eliminate a free line of sight in the flow direction, wherein the recesses in the flow influencing elements are slots having a longitudinal direction that runs substantially radially.

2. Accessory apparatus for flowmeters, in accordance with claim 1, wherein the slots have a ratio of the length to width that is greater than 1.

3. Accessory apparatus for flowmeters in accordance with claim 1, wherein the width of the slots increases in the radial direction.

4. Accessory apparatus for flowmeters in accordance with claim 1, wherein the width of the slots first increases in proportion to the radius, and then decreases in the radial direction at an outer end portion of the slots.

5. Accessory apparatus for flowmeters in accordance with claim 1, further comprising at least one of sound-absorbing and/or noise-damping material provided among the flow influencing elements.

6. Accessory apparatus for flowmeters accordance with claim 1, wherein the slots in the flow influencing elements are implemented in at least one concentric circular ring.

7. Accessory apparatus for flowmeters in accordance with claim 6, wherein the slots in the flow influencing elements are implemented on a plurality of circular rings which are concentric to one another.

8. Accessory apparatus for flowmeters in accordance with claim 7, wherein the number of slots which of the concentric circular rings increases from an innermost ring of slots to an outermost ring of slots.

9. Accessory apparatus for flowmeters in accordance with claim 8, wherein there are three concentric circular rings of slots, six slots being provided on the innermost ring, twelve slots on a middle ring and twenty four slots on the outermost ring.

\* \* \* \* \*